(12) United States Patent
Swoboda

(10) Patent No.: US 10,059,521 B2
(45) Date of Patent: Aug. 28, 2018

(54) HOLDING DEVICE AND STORAGE SYSTEM FOR CONTAINER STACKS

(71) Applicant: Extor GmbH, Hannover (DE)

(72) Inventor: Martin Swoboda, Hannover (DE)

( * ) Notice: Subject to any disclaimer, the term of this patent is extended or adjusted under 35 U.S.C. 154(b) by 14 days.

(21) Appl. No.: 15/501,303

(22) PCT Filed: Aug. 4, 2015

(86) PCT No.: PCT/EP2015/067982
§ 371 (c)(1),
(2) Date: Feb. 2, 2017

(87) PCT Pub. No.: WO2016/020397
PCT Pub. Date: Feb. 11, 2016

(65) Prior Publication Data
US 2017/0217684 A1    Aug. 3, 2017

(30) Foreign Application Priority Data

Aug. 4, 2014  (EP) .................................. 14179675

(51) Int. Cl.
*B65G 57/30*  (2006.01)
*F27B 9/38*  (2006.01)
(Continued)

(52) U.S. Cl.
CPC ............. *B65G 1/14* (2013.01); *B65G 1/0471* (2013.01); *B65G 57/302* (2013.01);
(Continued)

(58) Field of Classification Search
CPC .. B65G 59/101; B65G 57/302; B65G 59/062; B65G 59/063; B65G 60/00; Y10S 414/108
(Continued)

(56) References Cited

U.S. PATENT DOCUMENTS 3,363,781 A * 1/1968 Magnetti ................. B28B 13/04
414/788.8
3,478,897 A * 11/1969 Dykeman ............ B65G 57/302
198/633
(Continued)

FOREIGN PATENT DOCUMENTS

FR    1536950 A * 9/1968 ........... B65G 59/101
JP    62046815 A * 2/1987
(Continued)

*Primary Examiner* — Gregory W Adams
(74) *Attorney, Agent, or Firm* — Casimir Jones, S.C.; Mary Ann D. Brow

(57) ABSTRACT

The invention relates to a holding device (1) for a container stack (200) which is stored and removed from below and to a storage system (100) for container stacks (200) which are stored and removed from below. The holding device (1) for a container stack (200) which is stored and removed from below has a holding hook (2) which comprises a support arm (3) that can be pivoted about a pivot axis (5) between a holding position for holding a container stack (200) and a removal position for removing a container (201) of the container stack (200). The holding device also has a trigger arm (4) which is rotationally fixed relative to the support arm (3). An instability balancing position is provided between the holding position and the removal position. The holding device (1) further comprises a restoring element (7) which is designed to push the support arm (3) to the holding position or to push the support arm (3) to the removal position when the support arm (3) is being pivoted.

14 Claims, 13 Drawing Sheets

Figure 2A:
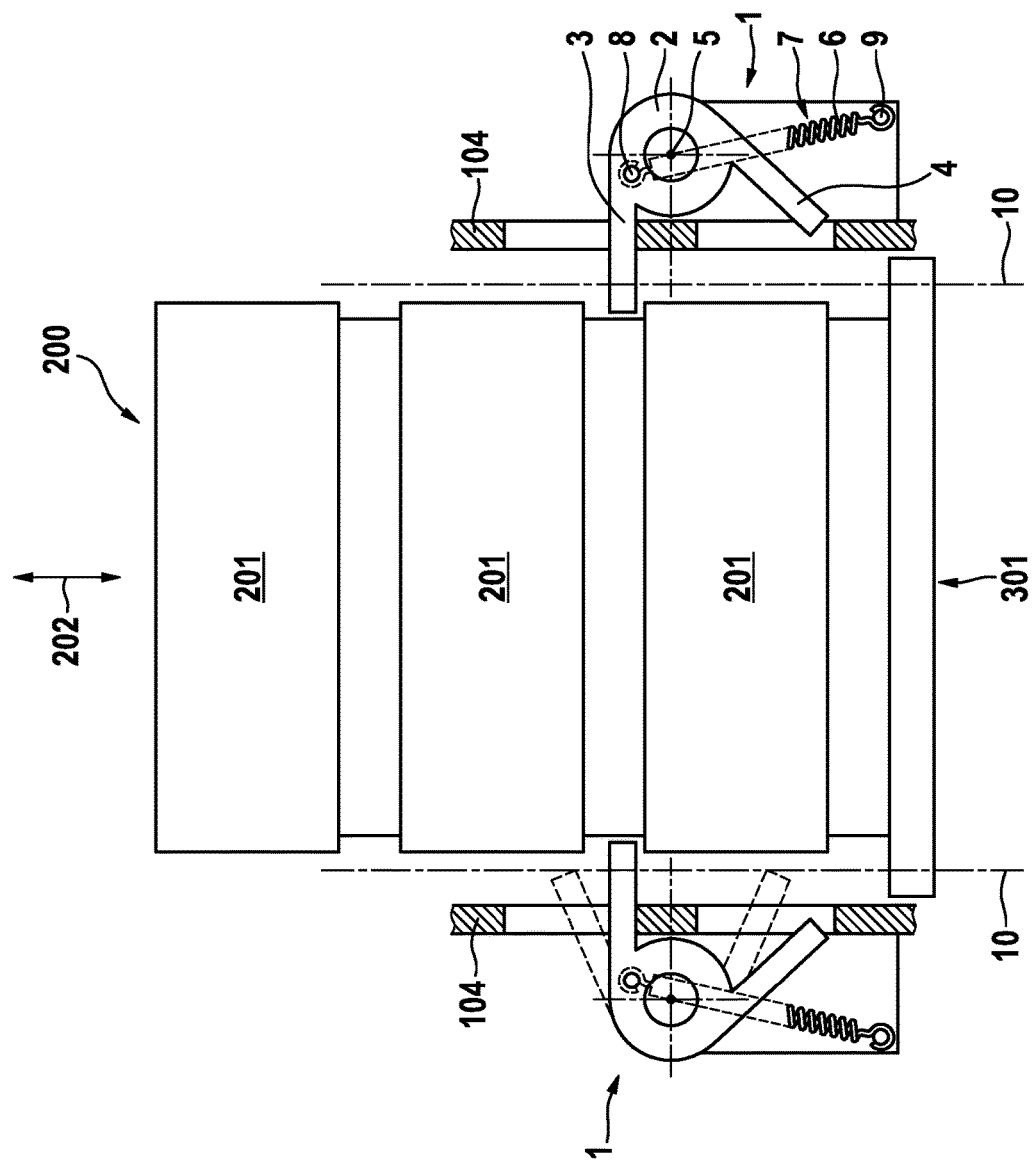

(51) Int. Cl.
 B65G 59/06 (2006.01)
 B65G 1/14 (2006.01)
 B65G 59/10 (2006.01)
 B65G 1/04 (2006.01)
(52) U.S. Cl.
 CPC ......... *B65G 59/062* (2013.01); *B65G 59/063* (2013.01); *B65G 59/101* (2013.01)
(58) Field of Classification Search
 USPC .... 211/150, 41.1, 59.2, 59.3, 59.4; 221/192, 221/194, 195, 297, 298; 414/795.3, 414/795.6, 797.4, 798, 929, 933
 See application file for complete search history.

(56) References Cited

U.S. PATENT DOCUMENTS

| | | | | |
|---|---|---|---|---|
| 3,765,546 A | * | 10/1973 | Westerling | B65G 59/062 414/788.7 |
| 3,895,477 A | * | 7/1975 | Yamashita | B30B 15/32 254/122 |
| 4,555,876 A | * | 12/1985 | Ohtake | H01L 21/67144 414/790.4 |
| 5,033,935 A | * | 7/1991 | Decrane | B65G 59/063 414/798.1 |
| 7,549,557 B2 | * | 6/2009 | Lehmann | B65G 47/1471 221/208 |
| 8,118,531 B2 | * | 2/2012 | Watanabe | H05K 13/0439 269/254 CS |
| 2002/0195316 A1 | * | 12/2002 | Bertuzzi | B65G 47/57 198/457.01 |

FOREIGN PATENT DOCUMENTS

| | | | | |
|---|---|---|---|---|
| JP | | 05201544 A | * 8/1993 | |
| JP | | 2000233832 A | * 8/2000 | |
| WO | WO-2010097425 A1 | * 9/2010 | ........... B65G 57/302 | |

* cited by examiner

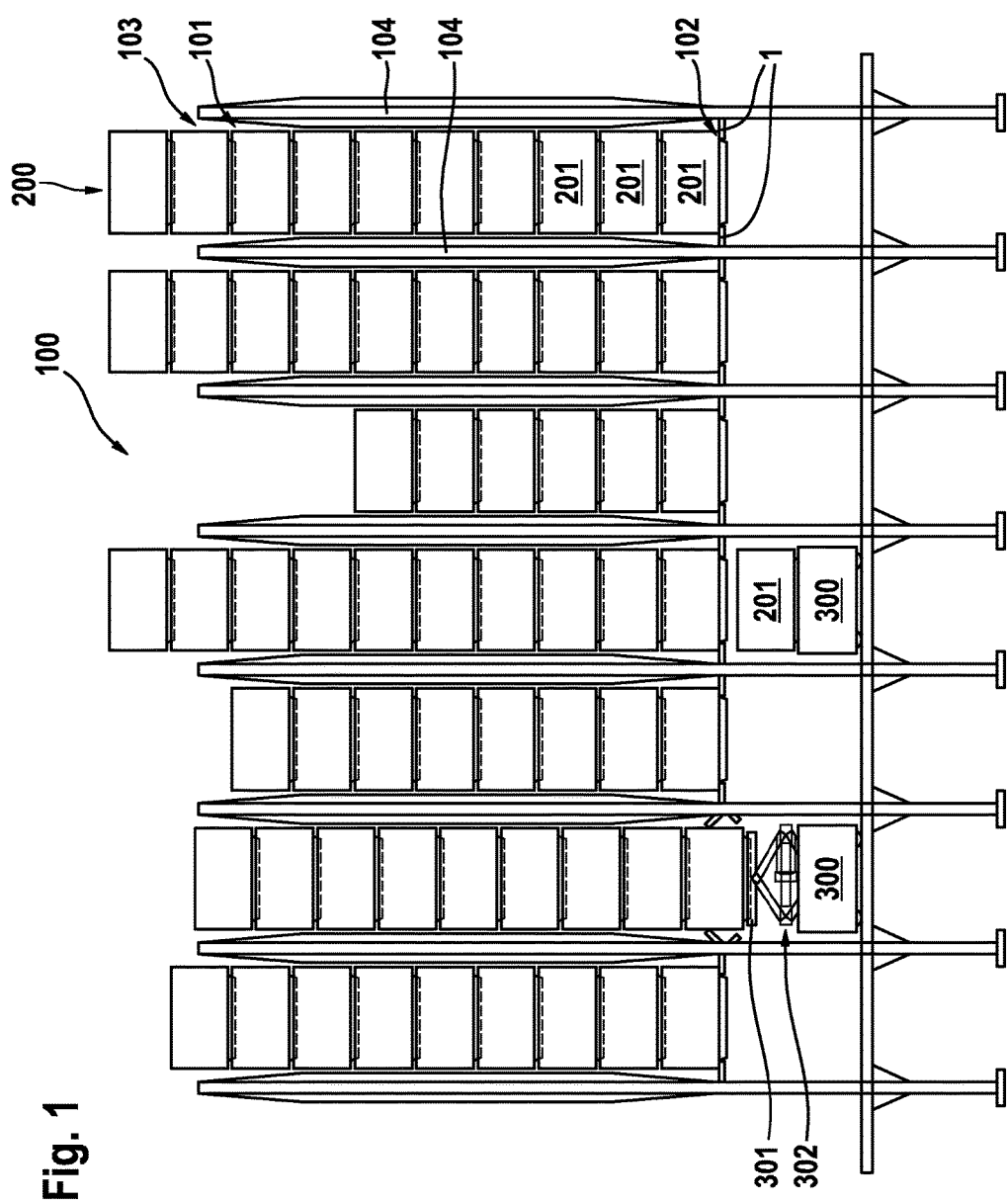

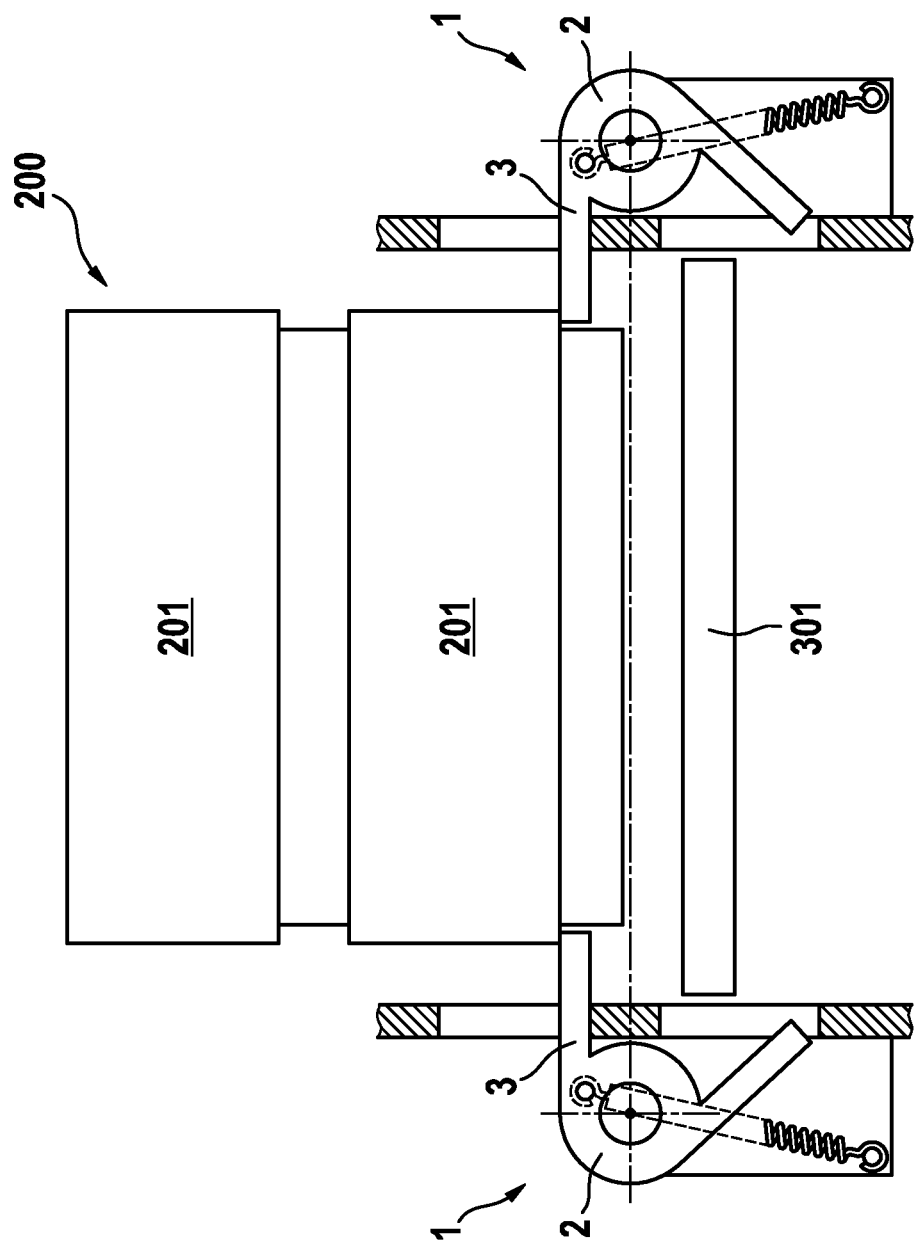

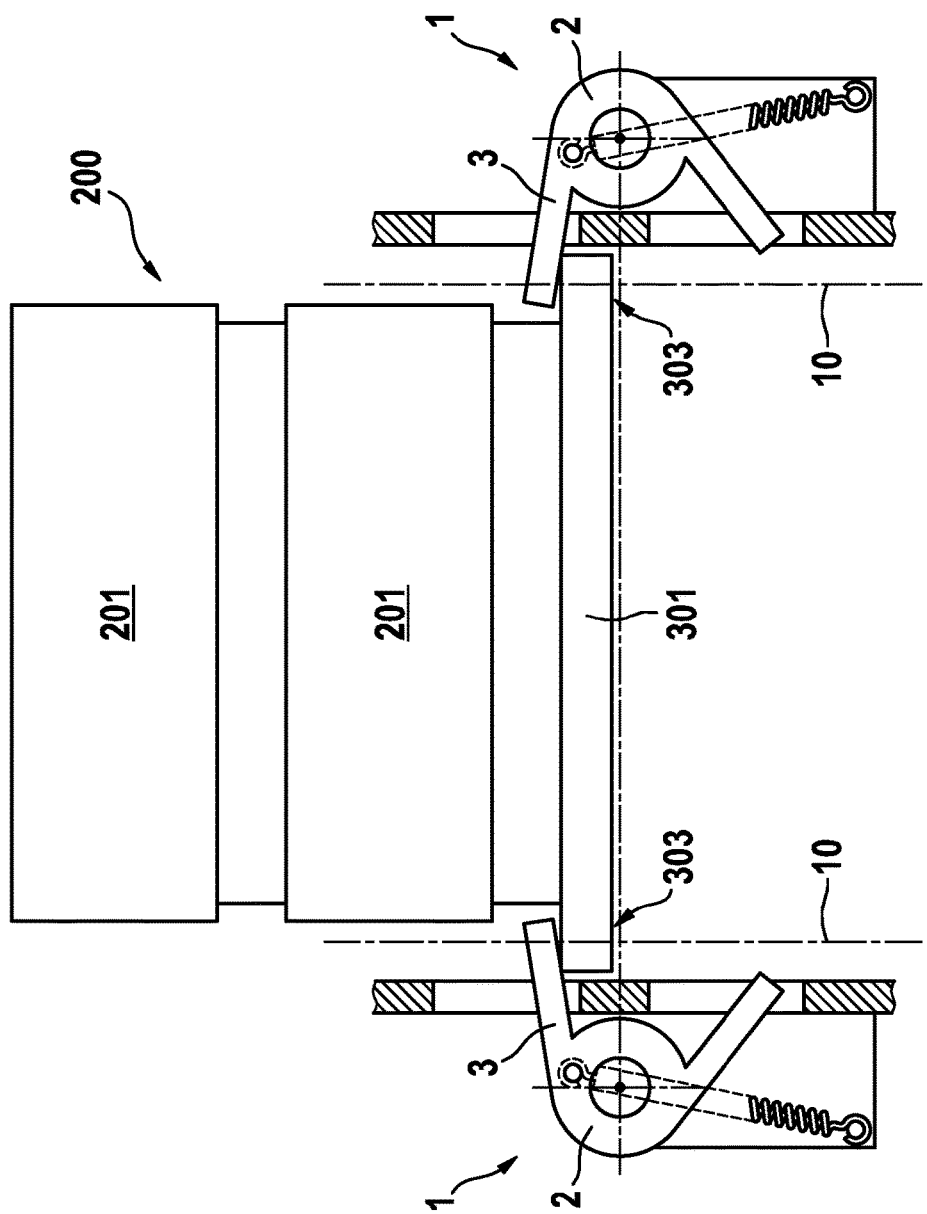

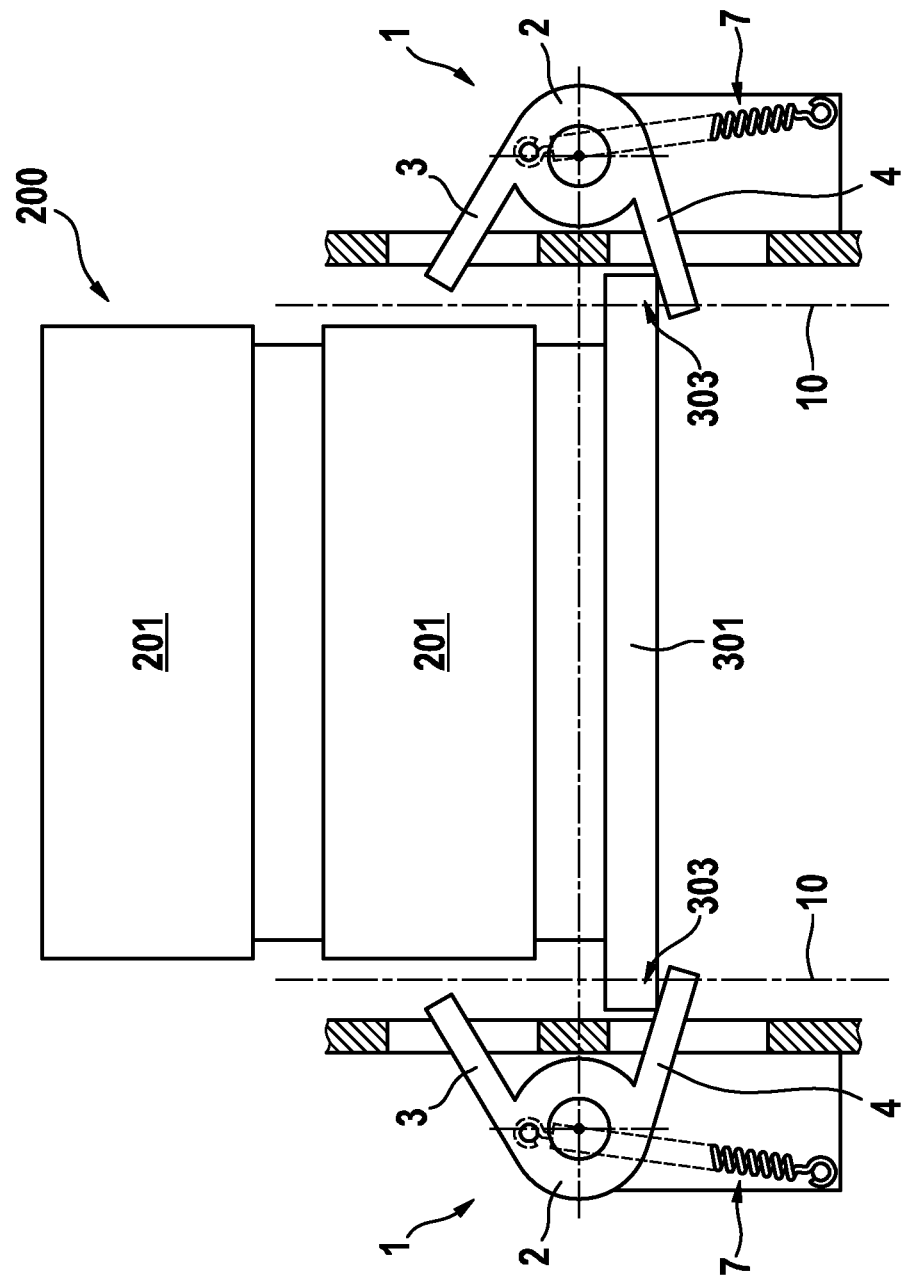

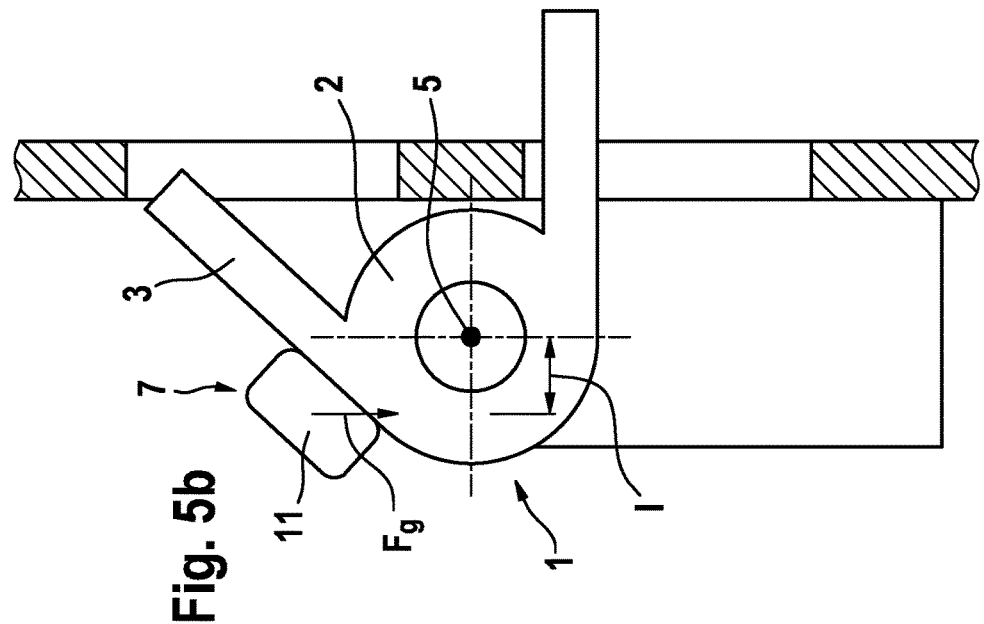
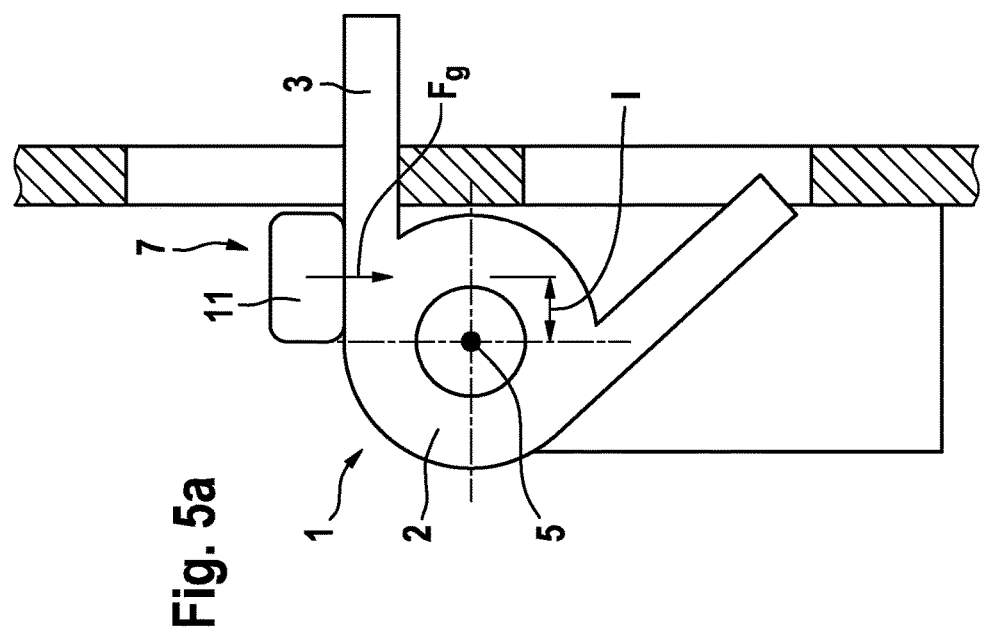

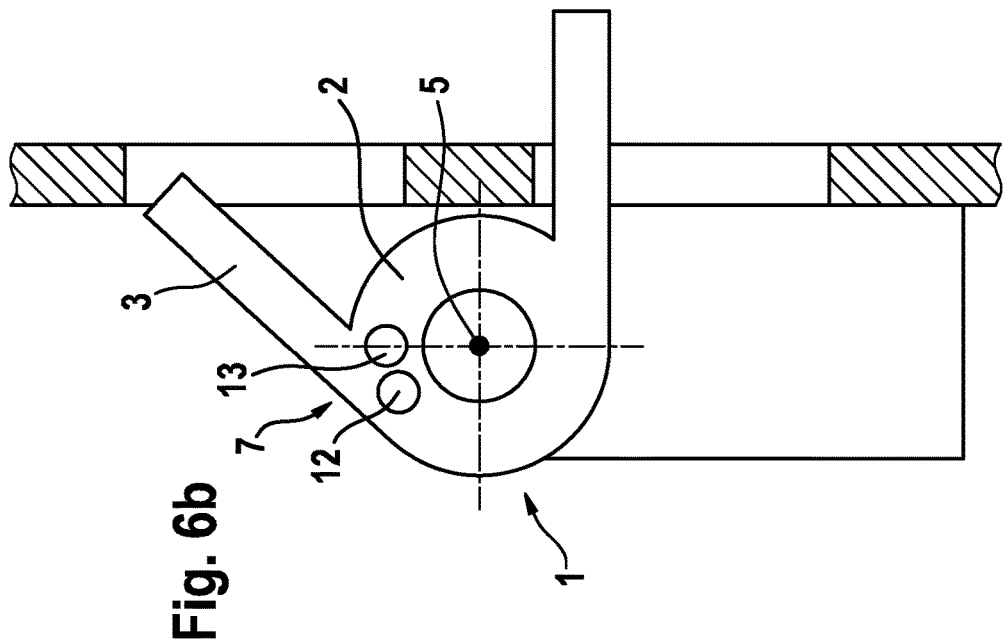
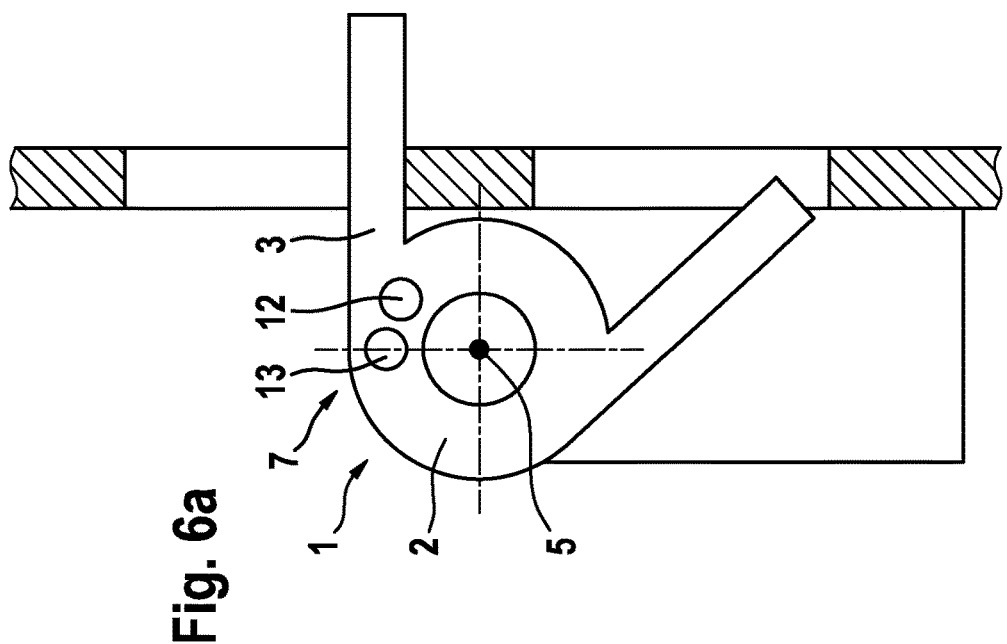

HOLDING DEVICE AND STORAGE SYSTEM FOR CONTAINER STACKS

The present application is a § 371 US National Entry of International Application No. PCT/EP2015/067982, filed Aug. 4, 2015, which claims the benefit of European Patent Application No. 14179675.5, filed Aug. 4, 2014.

The invention relates to a holding device for a container stack with stocking and retrieving from below, and to a storage system for container stacks with stocking and retrieving from below.

Storage systems for container stacks with stocking and retrieving from below, are known in the prior art. In the case of respective storage systems, container stacks that are formed from a plurality of containers that are stacked on top of one another in the vertical direction are spaced apart from the floor by holding devices such that a loading device, for example a transportation vehicle, may be moved below the container stack, so as to be able to stock individual containers in a container stack, or to retrieve individual containers from a container stack.

In order for a container to be stocked in a container stack, the container by the loading device is typically driven from below to the container stack and pushed up in such a manner that the container stack in its entirety, with the container to be stocked now being the lowermost container, is vertically displaced upward until the container to be stocked, or the lowermost container, respectively, is held by the holding device. The loading device is subsequently free again.

In order for a container to be retrieved, the loading device is driven to the container stack of which the lowermost container is to be retrieved. The holding device is subsequently released for a certain period of time, and the loading device lowers the entire container stack until the second container from the bottom, and thus also the containers lying thereabove, are held by the holding device which at this point in time is no longer released. The container to be retrieved is then free, and may be transported away by the loading device.

If a container other than the lowermost container of a container stack is to be retrieved, successive retrieving and restacking of the respective lowermost container of the container stack to other container stacks is required.

A respective storage system for container stacks with stocking and retrieving from below is described in document DE 198 49 391 A1. The holding devices in the case of this storage system are configured as spring locks. In order for the holding devices to be briefly released for stocking or retrieving a container, complex mechanical switching or actuating means are required on the loading device, by way of which the holding devices may be released in a targeted manner for the period of time required for stocking or retrieving a container. In the case of this prior art it is disadvantageous that respective switching or actuating means are complex and cost-intensive both in terms of construction as well as maintenance.

The invention is thus based on the object of achieving holding devices for a container stack with stocking and retrieving from below, that are improved in relation to the prior art, and to achieve an improved storage system for container stacks with stocking and retrieving from below, in which the disadvantages of the prior art no longer arise or still arise only to a limited extent.

This object is achieved by a holding device according to the main claim and by a storage system according to claim 8.

Accordingly, the invention relates to a holding device for a container stack with stocking and retrieving from below, having a holding hook comprising a support arm which is pivotable about a rotation axis between a holding position for holding a container stack and a retrieving position for retrieving a container of the container stack, and having a release arm which is rotationally fixed in relation to the support arm, wherein a position of unstable equilibrium is provided between the holding position and the retrieving position, and the holding device comprises a restoring element, wherein the restoring element in the case of the support arm pivoting in the region between the holding position and the position of unstable equilibrium is configured for urging the support arm toward the holding position, and in the case of the support arm pivoting in the region between the position of unstable equilibrium and the retrieving position is configured for urging the support arm toward the retrieving position, and wherein the release arm is configured in such a manner that the former in the retrieving position and in the position of unstable equilibrium of the support arm intersects a releasing plane which is parallel with the height of the container stack to be held, intersects the support arm in the holding position and in the position of unstable equilibrium, and does not intersect the release arm in the holding position of the support arm.

The invention furthermore relates to a storage system for container stacks with stocking and retrieving from below, comprising at least one vertical shaft for at least partially receiving a container stack, having a lower opening for stocking and retrieving containers, wherein at least one holding device for holding a container stack in the shaft is provided in the region of the lower opening of the at least one shaft, and at least one of the holding devices is configured according to the invention.

The holding device according to the invention is distinguished in that the pivoting thereof, both from the holding position to the retrieving position as well as back to the holding position, that is required for retrieving a container from the container stack being held may be achieved solely by a movement of a releasing element along the releasing plane, parallel with the height of the container stack. On account thereof, it is possible for the holding device to be established already by way of a releasing element which is disposed so as to be fixed on a storage operation apparatus which for stocking and retrieving a container in or from the container stack is already displaced in a manner parallel with the height of the container stack. The releasing element in this case may be a protrusion or a fixed outrigger on the storage operation apparatus, for example. In any case, in principle no discrete mechanism or actuatable actuator is required for the releasing element, as is the case in the prior art. Accordingly, by virtue of the holding devices according to the invention a storage operation apparatus may be designed in a less complex manner as compared with the prior art, saving significant effort and thus cost both in terms of construction as well as maintenance.

The holding device according to the invention may be elucidated in more detail by way of the description of examples of a typical stocking procedure and of a typical retrieving procedure. In the initial state, a container stack is held by a plurality of holding devices according to the invention, for example by four of the latter that are disposed in a rectangle, such that the lowermost container bears on the holding devices. More specifically, the lowermost container bears on the support arms of the holding hooks of the holding devices that are in the holding position.

In order for a further container to be stocked in the container stack, the container to be stocked by a storage operation apparatus is driven from below to the lowermost container of the container stack and is then lifted such that the container to be stocked henceforth forms the lowermost container of the container stack, the entire container stack being lifted. The support arms of the holding hooks, during lifting of the container stack, are pivoted upward in such a manner that said support arms slide laterally along the container to be stocked. The support arms herein are only pivoted to a position between the holding position and the position of unstable equilibrium, such that the restoring elements urge the support arms back toward the holding position. Once the container stack has been lifted sufficiently, the support arms may engage below the lowermost container, wherein said support arms by virtue of the restoring elements are pivoted to the holding position. Once the storage operation apparatus has again been displaced further downward, the container stack is lowered onto the support arms of the holding hooks, and is then held by the holding devices. The lowermost container of the container stack in this case is then that container that had to be stocked at the commencement of the stocking procedure.

In order for the lowermost container of a container stack to be retrieved, the storage operation apparatus is driven to the lowermost container of the container stack, and the container stack is lifted specifically beyond the height which the storage operation apparatus reaches in order for a container to be stocked. Stationary releasing elements which protrude into the releasing planes of the individual holding devices are provided on the storage operation apparatus. The releasing elements may be outriggers of the container receptacle on which the container to be retrieved is intended to bear after being retrieved, for example. It is also possible for the container receptacle to correspondingly protrude laterally far beyond the container to be retrieved.

In that the storage operation apparatus is displaced to a greater height than when stocking containers, the releasing elements may come into contact with the support arms and pivot the latter into the region between the position of unstable equilibrium and the retrieving position. Thereupon the restoring elements will move the support arms to the retrieving position, the release arms of the holding hooks thus protruding into the releasing plane. Simultaneously, the retrieval of the lowermost container of the container stack in a downward manner is not impeded by the support arms in the retrieving position.

The release arms come into contact with the releasing elements when the storage operation apparatus is subsequently being lowered, the former being pivoted in such a manner that the support arms of the holding hooks that are connected in a rotationally fixed manner to the release arms are pivoted to a region between the position of unstable equilibrium and the holding position, the support arms thus being urged back toward the holding position. When the storage operation apparatus is being further lowered, the support arms then initially slide along the side walls of the container to be retrieved prior to engaging between the container to be retrieved and the container lying thereabove. Should the storage operation apparatus be lowered further, the support arms pivot to the holding position, wherein that container that previously was lying above the container to be retrieved bears directly on the holding devices, thus henceforth forming the lowermost container of the container stack. The container to be retrieved bears on the storage operation apparatus and may be transported onward.

It is to be noted that the stocking and retrieving procedures described are merely exemplary illustrations in which reference is particularly made to a particular design embodiment of the storage operation apparatus. However, it is self-evident that other design embodiments of the storage operation apparatus and other stocking and retrieving procedures resulting therefrom are possible. It is also possible for dissimilar storage operation apparatuses to be employed for retrieving and for stocking, for example. Irrespectively thereof, it is to be stated that the holding devices according to the invention may be operated solely by a movement of a releasing element along the releasing plane. Since the releasing plane runs parallel with the height of the container stack, the displacement capability typically provided by the storage operation apparatus may however be used solely in exactly this direction in order for the holding device according to the invention to be operated. In any case, complex actuating or switching elements as are known from the prior art are not required, as can also be derived directly from the example.

It is preferable for the restoring element to be a spring, preferably a tension spring, having two spring ends, wherein the one spring end is fastened to the holding hook of the holding device, the other spring end being fastened in a stationary manner. "Stationary" in this context means that the spring end is locationally fixed in relation to the rotation axis of the holding hook. The desired functional mode of the restoring element may be readily achieved by way of a suitable choice for the engagement point of the spring on the holding hook, and for the point of the stationary fastening. In the case of a holding hook which is balanced in relation to the rotation axis thereof, the spring may be disposed in such a manner that the axis of the spring in the state of unstable equilibrium intersects the rotation axis of the holding hook, for example. Should the holding hook not be balanced, the spring element is to be disposed such that an equilibrium of momentums about the rotation axis results on the holding hook in the state of unstable equilibrium.

Alternatively, it is possible for the restoring element to be a restoring mass that is provided on the holding hook. In that the restoring mass is disposed on the holding hook and thus is pivoted conjointly with the latter, the displacement of the center of gravity of the holding hook when the latter is being pivoted may be influenced in such a manner that the desired functional mode of the restoring element is achieved. The common center of gravity of the holding hook and of the restoring mass in the state of unstable equilibrium of the holding device is then located on a vertical line with the rotation axis of the holding hook.

It is also possible for the restoring mass to be configured so as to be integral to the holding hook, and in particular integral to the support arm and/or the release arm. In other words, the shaping of the holding hook may already be chosen in such a manner that the displacement of the center of gravity that is required for the desired functional mode is achieved during pivoting.

Alternatively, it is furthermore possible for the restoring element to comprise two magnetic elements, wherein the one magnetic element is disposed on the holding hook, and the other magnetic element is disposed so as to be stationary, the magnetic elements being mutually aligned in such a manner that they are mutually repellent. "Stationary" in this context means that the other magnetic element is locationally fixed in relation to the rotation axis of the holding hook. Since the magnetic elements are intended to be mutually repellant, an arrangement of the magnetic elements by way of which the desired functional mode of the restoring element is achieved may be readily found. In the case of a holding hook that is balanced in relation to the rotation axis, the magnetic elements may be disposed in such a manner that the latter in the state of unstable equilibrium lie on a common axis that is parallel with the rotation axis, for example. Should the holding device not be balanced, the position of the magnetic elements is to be adapted in a corresponding manner, so as to achieve the desired state of unstable equilibrium in the position of unstable equilibrium.

The holding hook may preferably be configured as a V-shaped double lever, wherein the one leg of the double lever may be the support arm, the other leg of the double lever potentially being the release arm. The two legs may preferably have the same length. The rotation axis of the holding hook is preferably disposed between support arm and release arm. Cost-effective manufacturing of the holding hook is possible by way of corresponding individual or combined design features.

It is preferable for the releasing plane to be parallel with the rotation axis of the holding hook.

The storage system according to the invention comprises at least one vertical shaft having a lower opening, at least one holding device according to the invention being provided in the region of latter. Reference is made to the preceding comments in order for the functional mode to be explained. Should more than one vertical shaft be provided, the individual shafts are preferably disposed beside one another in the longitudinal direction and transverse direction of the storage facility.

The shaft of the storage system according to the invention in this case may have a height which is suitable for completely receiving the maximum envisaged height of a container stack. However, it is also possible for the shaft to have an upper opening from which the container stack may protrude. In as far as the container stack is inherently sufficiently stable, or that stability is conferred to the latter by way of further elements, it is also possible in the case of a presence of an upper opening for the shaft to have a height that corresponds to some fewer stacked containers or even less than the height of a single container. A (continuous) wall for delimiting the shaft is not required.

It is preferable for one holding device, preferably at least two holding devices, according to the invention to be provided in the region of the lower opening on each of two opposite sides of the shaft.

It is furthermore preferable for the spacing between two opposite holding devices to be chosen in such a manner that, when stocking a container from below, the support arms of the holding hooks of the holding devices are pivoted by the container to be stocked only in the region between the respective holding positions and positions of unstable equilibrium thereof. It may be ensured by way of a suitable choice of the spacing that pivoting of the support arms up to the retrieving position takes places solely by way of the contact between the support arms and a container to be stocked.

The storage system preferably comprises a storage operation apparatus for stocking and retrieving containers from below, which storage operation apparatus when retrieving the lowermost container of a container stack laterally projects beyond the container to be retrieved in such a manner that the support arms of the holding hooks of the holding devices, when lifting the container stack by way of the storage operation apparatus, by way of the lateral projection are pivotable to the respective regions between the position of unstable equilibrium and the retrieving position. The retrieving procedure described above in an exemplary manner above is enabled by a respective storage operation apparatus.

Figure 2B:
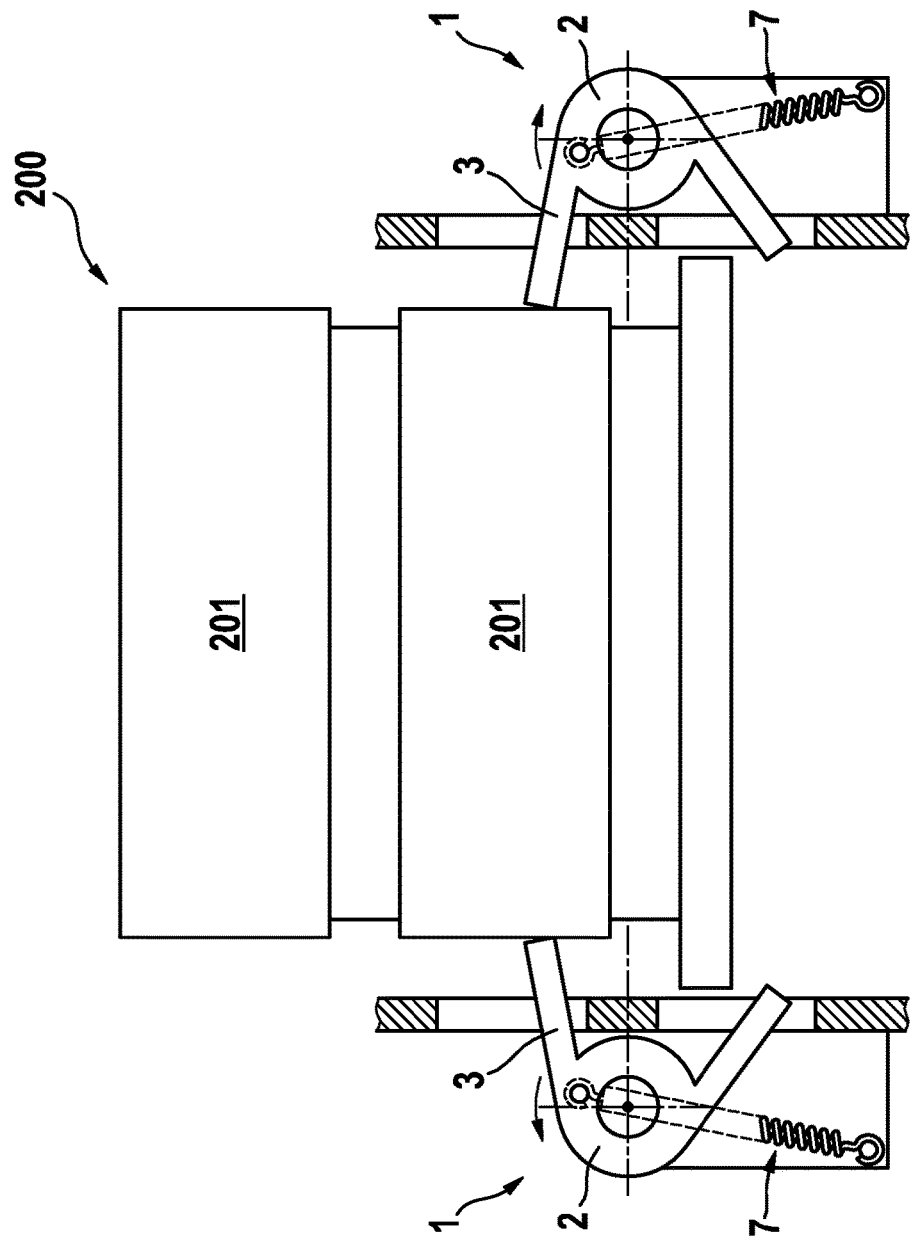
Figure 2C:
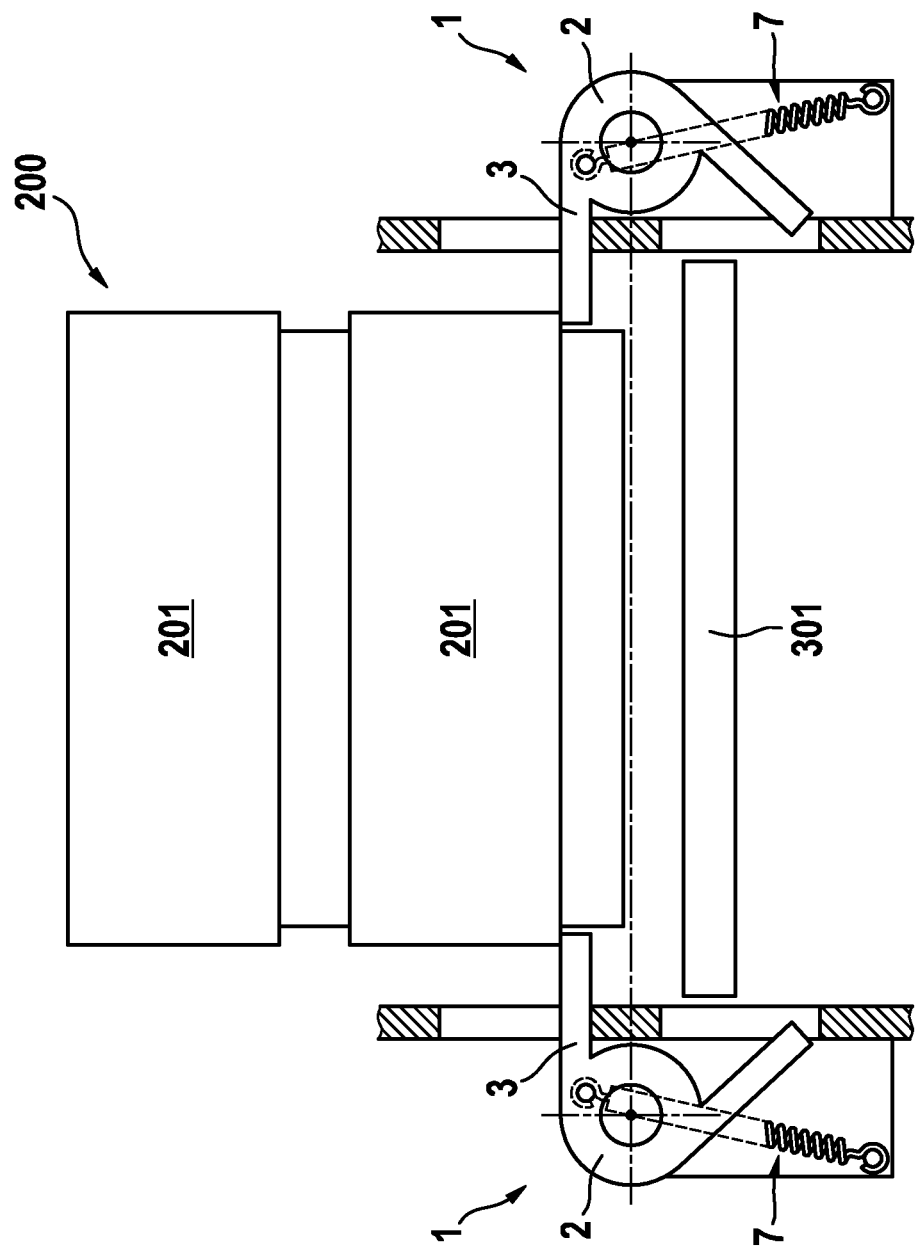
Figure 3A:
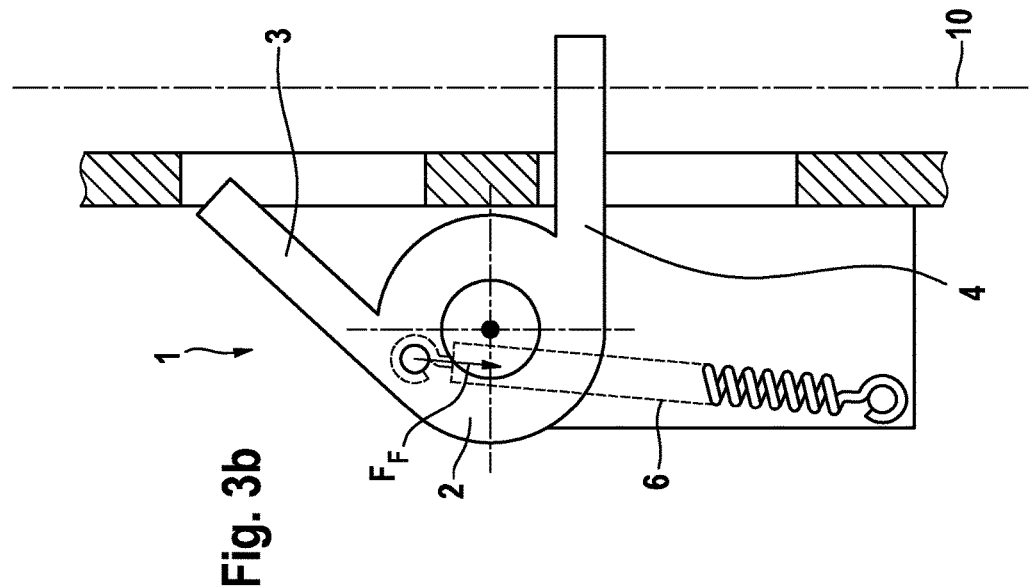

The invention will now be described in an exemplary manner by means of preferred embodiments with reference to the appended drawings, in which:

FIG. 1 shows a side view of a first exemplary embodiment of a storage system according to the invention, comprising a first exemplary embodiment of holding devices according to the invention;

FIGS. 2a-c show a schematic illustration of a stocking procedure of a container in the storage system according to FIG. 1;

FIGS. 3a,b show detailed illustrations of the holding device of FIGS. 1 and 2;

FIGS. 4a-f show a schematic illustration of a retrieving procedure of a container from the storage system according to FIG. 1;

FIGS. 5a,b show detailed illustrations of a second exemplary embodiment of a holding device according to the invention; and FIGS. 6a,b show detailed illustrations of a second exemplary embodiment of a holding device according to the invention.

A storage system 100 according to the invention is illustrated in a side view in FIG. 1. The storage system 100 comprises a multiplicity of vertical shafts 101 each for receiving one container stack 200 having a plurality of containers 201, wherein, apart from the shafts 101 that are visible in FIG. 1 and are sequenced beside one another in the longitudinal direction, additional shafts are provided in the transverse direction, perpendicular to the sheet plane. The shafts 101 in the plan view thus form a rectangular arrangement.

Each shaft 101 has a lower opening 102, holding devices 1 for holding the container stack 200 that is located in the shaft 101 being provided in the range of said opening. The lowermost container 201 of the container stack 200 herein bears on the holding devices 1.

The lower opening 102, or the holding devices 1 that are provided there, respectively, are disposed at a height such that storage operation apparatuses 300, even when loaded with a container 201, may be displaced in the direction of the sheet plane, or else perpendicularly thereto, below the container stacks 200 that are located in the shafts 101.

The holding devices 1 on the lower opening 102 are disposed in each case on opposite sides of the shaft 101, wherein two holding devices 1 that are spaced apart in a manner perpendicular to the sheet plane are provided on each side of the shaft 101. Four holding devices 1 are thus provided in the region of the lower opening 102 of one of each shaft 100. The holding devices 1 will yet be explained in more detail in the context of the following figures.

Each shaft 101 furthermore has an upper opening 103 such that a received container stack 200 may protrude upward from the shaft 101, if and when the height of said container stack 200 exceeds the height of the shaft 101. Each shaft 101 is laterally delimited by elements 104.

As mentioned, the storage operation apparatuses 300 are displaceable in the direction of the sheet plane, but also perpendicular thereto. Moreover, said storage operation apparatuses have a container receptacle 301 which by way of a lifting mechanism 302 may be displaced in the vertical direction.

FIG. 2a shows a schematic section through the lower region of a shaft 101 of the storage system 100 of FIG. 1. The elements 104 that delimit the shaft 101 are only partially illustrated. The same applies to the container stack 200 having the lowermost container 201 bearing on the holding devices 1.

The holding devices 1 each comprise one holding hook 2 having a support arm 3 and a release arm 4, wherein the holding hook 2 is configured as a V-shaped double lever having two legs of the same length, the one leg forming the support arm 3, the other leg forming the release arm 4. The holding hook 2 herein is mounted so as to be rotatable about a rotation axis 5 which is disposed between support arm 3 and release arm 4.

The support arm 3 may be pivoted between the holding position (illustrated in FIG. 2*a*) and the retrieving position (shown in FIG. 4*c*) wherein a position of unstable equilibrium is provided between these two positions. The position of unstable equilibrium in FIG. 2*a* is indicated (with dashed lines) by the position of the support arm 3 of the one holding device 1.

The holding devices 1 each furthermore comprise one restoring element 7 that is designed as a tension spring 6. The one spring end 8 of the tension spring 6 is fastened to the holding hook 2, the other spring end 9 being fastened to elements 104 that laterally delimit the shaft 101. The other spring end 9 is thus fastened so as to be stationary in relation to the rotation axis 5 of the holding hook 2.

The linkage of the one spring end 8 to the holding hook 2 is furthermore chosen such that the support arm 3 of the holding hook 2, when the support arm 3 is being pivoted in a region between the holding position (shown in FIG. 1) and the position of unstable equilibrium indicated, is urged in the direction of the holding position. When the support arm 3 is being pivoted in a region between the position of unstable equilibrium (indicated in FIG. 1) and the retrieving position (shown in FIG. 4*c*), the support arm 3 by the restoring element 7 is urged in the direction of the retrieving position.

Figure 3B:
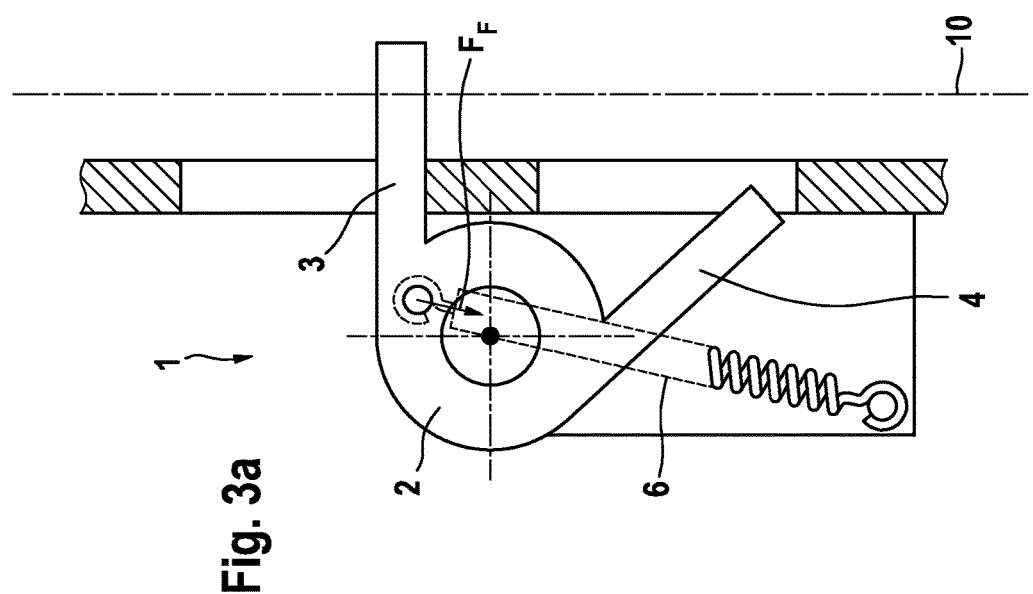

This condition is elucidated by means of FIGS. 3*a* and 3*b*. A holding device 1 according to FIG. 2*a* is illustrated in FIG. 3*a*, wherein the support arm 3 of the holding hook 2 is located in the holding position. In this case, the spring force $F_F$ of the spring 6 acts in such a manner that the support arm 3 is held in the holding position, or in the case of specific pivoting, is urged to the holding position. The spring force $F_F$ causes a respective momentum. In the example according to FIG. 3*a* this momentum acts in the clockwise direction about the rotation axis 5 of the holding hook 2.

This applies in a similar manner to the retrieving position (illustrated in FIG. 3*a*), having a support arm 3 which in relation to FIG. 3*a* is pivoted to the respective position. In this case, the spring force $F_F$ of the spring 6 acts in such a manner that the support arm 3 is held in the retrieving position or, in the case of specific pivoting, is urged to the retrieving position. In the example according to FIG. 3*b*, the momentum about the rotation axis 5 of the holding hook 2 that has been initiated by the spring force $F_F$ acts in a counter-clockwise manner.

The position of unstable equilibrium in which the support arm 3 is in principle not urged to any of the two positions mentioned (that is to say is in an equilibrium of momentums) is provided between holding position and retrieving position. However, any position of the support arm 3 that deviates from the position of unstable equilibrium inevitably leads to the support arm 3 being unequivocally urged in a determinable manner to either the holding position or to the retrieving position.

A releasing plane 1 is defined for each holding position 1. The releasing plane 10 herein is parallel with the height of the container stack 200 that is indicated by the double arrow 202. The releasing plane in the holding position that is illustrated in FIGS. 2*a* and 3*a* intersects the support arm 3, while the releasing plane 10 is not intersected by the release arm 4 in this position of the support arm 3. However, as can be seen from FIGS. 3*b* and 4*c*, the releasing plane 10 is intersected by the release arm 4 in the retrieving position of the support arm 3. In the position of unstable equilibrium, both the support arm 3 as well as the release arm 4 intersect the releasing plane 10.

The functional mode of the holding device 1 will be explained hereunder by means of exemplary stocking and retrieving procedures of a container 201 in or from a container stack 200, respectively. The stocking procedure herein will be described by means of FIGS. 2*a-c*, wherein the figures in each case show intermediate states of the stocking procedure.

In order for a container 201 to be stocked in the container stack 200, the container 201 to be stocked is driven by a storage operation apparatus 300 (not illustrated) having the container receptacle 301 from below to the originally lowermost container 201 of the container stack 200, and is then lifted such that the entire container stack 200 is lifted. At this point in time, the container 201 to be stocked already becomes the new lowermost container 201 of the container stack 200. This state is illustrated in FIG. 2*a*.

The entire container stack 200 is subsequently lifted further such that the support arms 3 of the holding hooks 2 of the holding devices 1 are pivoted upward in such a manner that the latter slide laterally along the container 201 to be stocked, or the lowermost container 201, respectively, as is illustrated in FIG. 2*b*. The support arms 3 herein are merely pivoted to a position between the respective holding position and position of unstable equilibrium thereof, such that the restoring elements 7 urge the support arms 3 back toward the holding position.

Once the container stack 200 has been lifted sufficiently far, the support arms 3 of the holding hooks 2 of the individual holding devices 1 may engage below the container 201 to be stocked, or the lowermost container 201, respectively, where said support arms 3 by virtue of the restoring elements 7 are pivoted to the holding position. Once the container receptacle 301 of the storage operation apparatus 300 is subsequently displaced downward once again, the container stack 200 is lowered onto the support arms 3 of the holding hooks 2, and is then held by the holding devices 1. After the stocking procedure that is thus concluded the container 201 to be stocked, or the lowermost container 201, respectively, bears on the support arms 3 of the holding hooks 2 and the container receptacle 301 of the storage operation apparatus 300 may be driven away. This state is illustrated in FIG. 2*c*.

The stocking procedure is thus concluded.

A retrieving procedure of a container 201 from a container stack 200 will now be described by means of FIGS. 4*a-f*.

In order for the lowermost container 201 of a container stack 200 to be retrieved, the container receptacle 301 of the storage operation apparatus 300 is driven to this very same container 201 which bears on the support arms 3 of the holding hooks 2 of the individual holding devices 1. This is illustrated in FIG. 4*a*. The entire container stack 200 is subsequently lifted by the storage operation apparatus 300 (cf. FIG. 4*b*). The container receptacle 301 herein is displaced beyond the height that is required for stocking a container 201 (cf. FIG. 2*b*), wherein the container receptacle 301 is configured such that the latter projects laterally beyond the container 201 to be retrieved, or the lowermost container 201, respectively, and protrudes into the releasing planes 10 of the individual holding devices 1. The laterally projecting regions of the container receptacle 301 form releasing elements 303 for the holding devices.

Once the container receptacle 301 is displaced sufficiently high the support arms 3 come into contact with the releasing elements 303, and are pivoted into the region between the position of unstable equilibrium and the retrieving position. The restoring elements 7 thereupon will move the support arms 3 to the retrieving position, the release arms 4 of the holding hooks 2 thus protruding into the releasing plane 10. The support arms 3 in the retrieving position no longer impede the retrieval of the lowermost container 301 in a downward manner. This is illustrated in a corresponding manner in FIG. 4c.

When the container stack 200 is being subsequently lowered by the container receptacle 301 of the storage operation apparatus 300, the release arms 4 come into contact with the release elements 303 and are pivoted in such a manner that the support arms 3, connected to the release arms 4 in a rotationally fixed manner, of the holding hooks 2 are pivoted to a region between the position of unstable equilibrium and the holding position, the support arms 3 thus being urged by the restoring elements 7 back toward the holding position. This procedure is indicated in FIG. 4d.

When the container receptacle 301 of the storage operation apparatus 300 is being lowered further, the support arms 3 then initially slide along the side walls of the container 201 to be retrieved (cf. FIG. 4e), prior to said support arms 3 engaging between the container 201 to be retrieved and the container 201 lying thereabove.

Figure 4C:
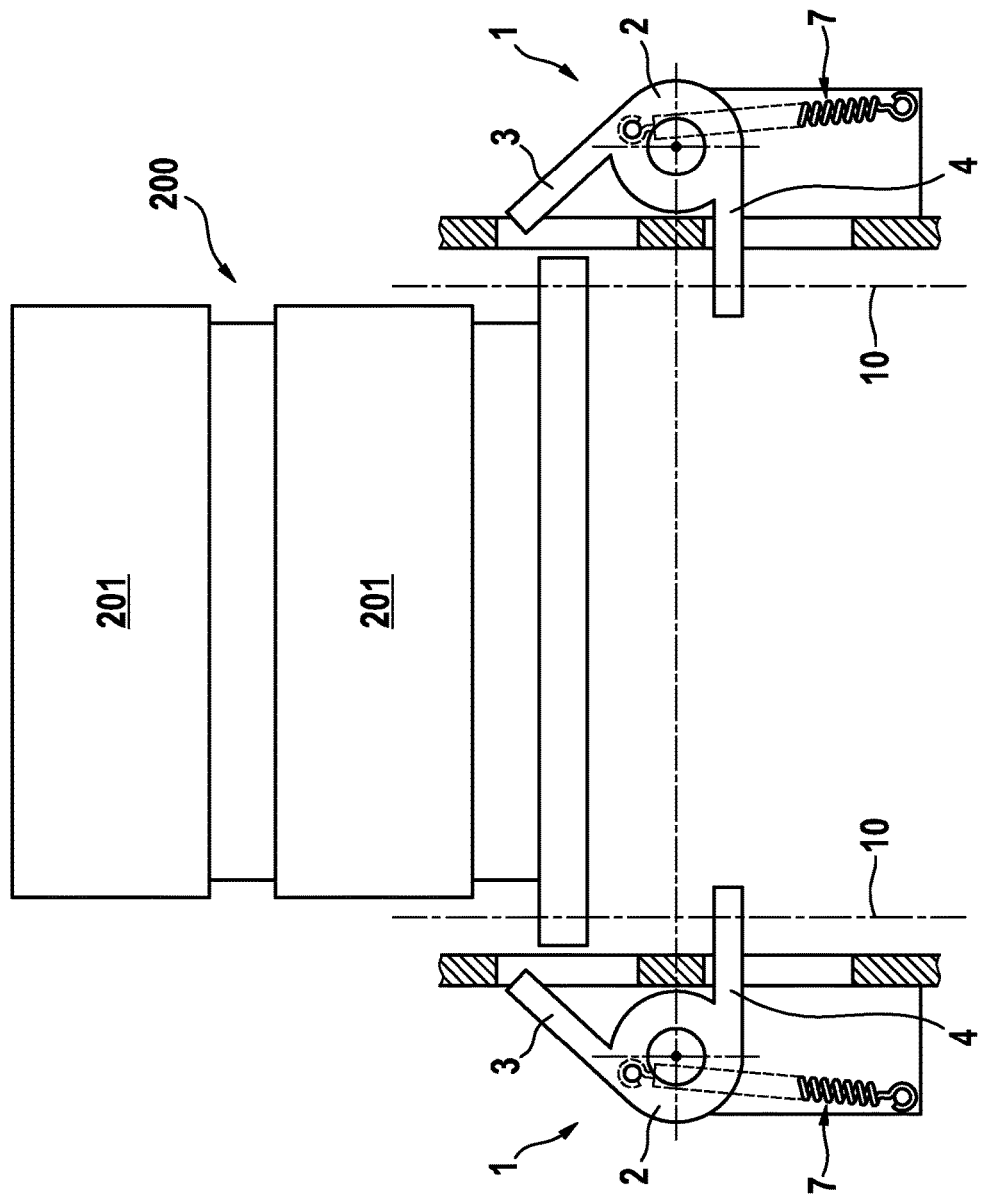
Figure 4E:
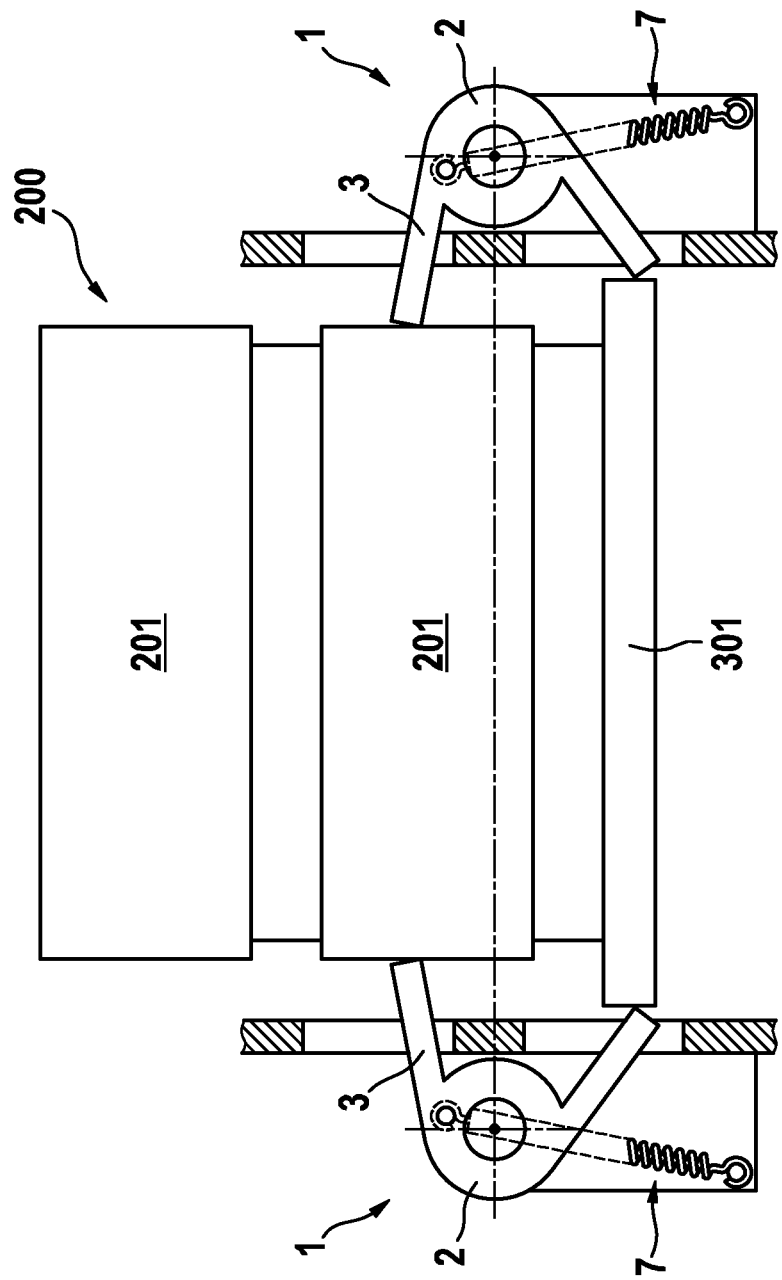
Figure 4F:
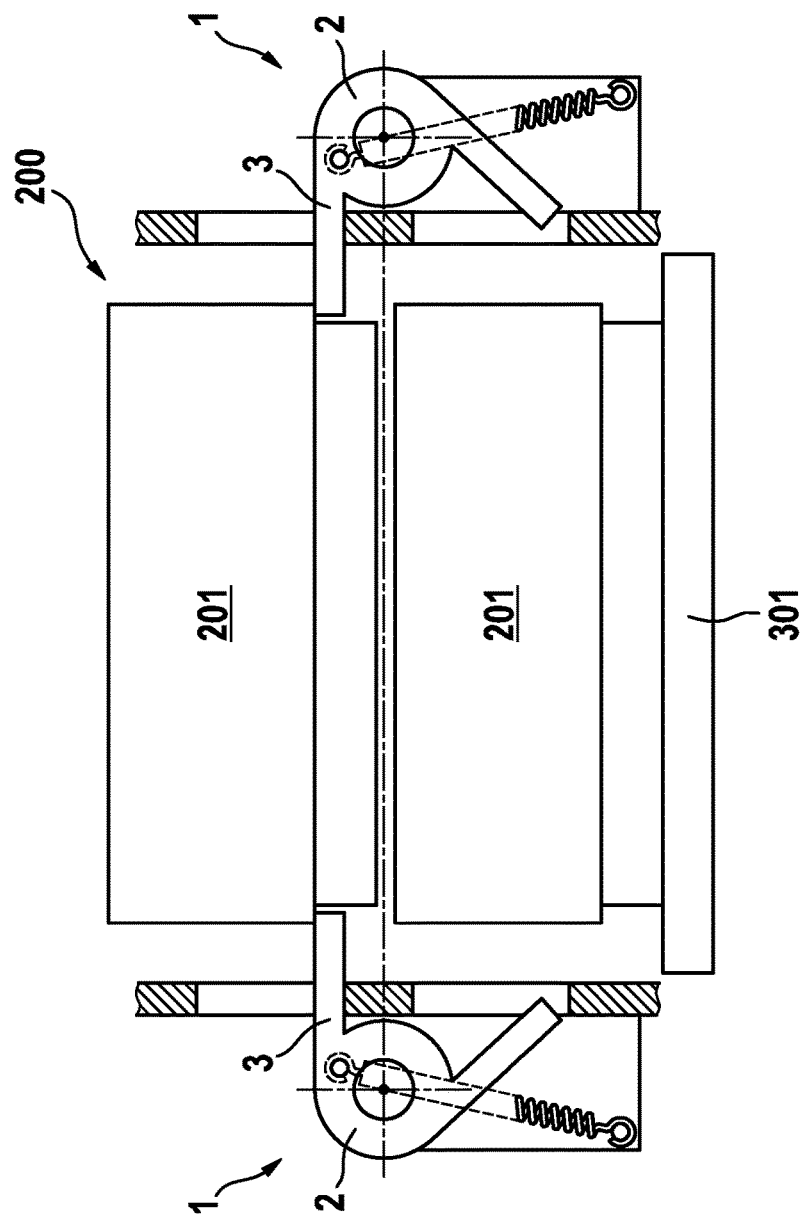

Once the container receptacle 301 of the storage operation apparatus 300 is lowered even further, the support arms 3 pivot to the holding position, wherein the container that previously was lying above the container 201 to be retrieved bears directly on the support arms 3 of the holding devices 1, thus henceforth forming the lowermost container 201 of the container stack 200. The container 201 to be retrieved bears on the container receptacle 301 of the storage operation apparatus 300 and may be transported onward. This is illustrated in FIG. 4f.

A second exemplary embodiment of a holding device 1 according to the invention is illustrated in FIGS. 5a and b. The holding device 1 according to FIGS. 5a,b herein differs from the holding device of the preceding figures only in the restoring element 7. Reference is therefore made to the preceding comments, also in terms of the functional mode of the holding device 1, while only the points of difference between the holding devices 1 of FIGS. 5a,b and the preceding figures will be explained hereunder.

The holding device 1 according to FIGS. 5a,b as a restoring element 7 has a restoring mass 11 which is disposed on the holding hook 2 in such a manner that said restoring mass 11 in the case of being pivoted between the holding position (illustrated in FIG. 5a) and the position of unstable equilibrium holds the support arm 3 in the holding position, or urges said support arm 3 toward this position. A momentum about the rotation axis 5 of the holding hook that is suitable therefor may be generated by the corresponding arrangement of the restoring mass 11 on the holding hook 2, a momentum in the example illustrated being in the clockwise direction.

In the case of the support arm 3 being pivoted between the position of unstable equilibrium and the retrieving position (cf. FIG. 5b), the by the restoring mass 11 in relation to the rotation axis 5 of the holding hook 2 acts in such a manner that the support arm 3 is held in the retrieving position, or is urged toward the retrieving position. This momentum in the exemplary embodiment illustrated acts counter to the clockwise direction.

By contrast to what is illustrated in FIGS. 5a,b the restoring mass 11 may also be configured so as to be integral to the holding hook 2.

A third exemplary embodiment of a holding device 1 according to the invention is illustrated in FIGS. 6a and b. The holding device 1 according to FIGS. 6a,b herein differs from the holding device of FIGS. 2 and 4 only in the restoring element 7. Therefore, reference is made to the preceding comments, also in terms of the functional mode of the holding device 1, and only the points of difference between the holding devices 1 of FIGS. 6a,b and those of FIGS. 2 and 4 will be explained hereunder.

The holding device 1 according to FIGS. 6a,b as a restoring element 7 has two magnetic elements 12, 13, wherein the one magnetic element 12 is disposed on the holding hook 2, the other magnetic element 13 being disposed so as to be stationary, that is to say locationally fixed, in relation to the rotation axis 5 of the holding hook 2. The magnetic elements 12, 13 herein are mutually aligned in such a manner that they are mutually repellent.

The magnetic elements 12, 13 are disposed such that when the support arm 3 of the holding hook 2 is being pivoted between the holding position (illustrated in FIG. 6a) and the position of unstable equilibrium, the support arm 3 by virtue of the repulsion is urged toward the holding position. When the support arm 3 is being pivoted between the position of unstable equilibrium and the retrieving position (illustrated in FIG. 6b), the repulsion between the two magnetic elements 12, 13 acts in such a manner that the support arm 3 is urged in the direction of the retrieving position.

The invention claimed is:

1. A holding device (1) for a container stack (200), with stocking and retrieving from below, having a holding hook (2) comprising a support arm (3) which is pivotable about a rotation axis (5) between a holding position for holding a container stack (200) and a retrieving position for retrieving a container (201) of the container stack (200), and having a release arm (4) which is rotationally fixed in relation to the support arm (3), wherein a position of unstable equilibrium is provided between the holding position and the retrieving position, and the holding device (1) comprises a restoring element (7), wherein the restoring element (7) in the case of the support arm (3) pivoting in the region between the holding position and the position of unstable equilibrium is configured for urging the support arm (3) toward the holding position, and in the case of the support arm pivoting in the region between the position of unstable equilibrium and the retrieving position is configured for urging the support arm (3) toward the retrieving position, and wherein the release arm (4) is configured in such a manner that the former in the retrieving position and in the position of unstable equilibrium of the support arm (3) intersects a releasing plane (10) which is parallel with the height (202) of the container stack (200) to be held, intersects the support arm (3) in the holding position and in the position of unstable equilibrium, and does not intersect the release arm (4) in the holding position of the support arm (3).

2. The holding device as claimed in claim 1, characterized in that the restoring element (7) is a spring (6) having two spring ends (8, 9), wherein the one spring end (8) is fastened to the holding hook (2), the other spring end (9) being fastened in a stationary manner.

3. The holding device as claimed in claim 2, characterized in that said spring (6), is a tension spring.

4. The holding device as claimed in claim 1, characterized in that the restoring element (7) is a restoring mass (11) that is provided on the holding hook (2).

5. The holding device as claimed in claim 4, characterized in that the restoring mass (11) is configured so as to be integral to the holding hook (2).

6. The holding device as claimed in claim 1, characterized in that the restoring element (7) comprises two magnetic elements (12, 13), wherein the one magnetic element (12) is disposed on the holding hook (2), and the other magnetic element (13) is disposed so as to be stationary, the magnetic elements (12, 13) being mutually aligned in such a manner that they are mutually repellent.

7. The holding device as claimed in claim 1, characterized in that the holding hook (2) is configured as a V-shaped double lever, wherein the one leg of the double lever is the support arm (3), the other leg of the double lever being the release arm (4).

8. The holding device as claimed in claim 1, characterized in that the rotation axis (5) of the holding hook (2) is disposed between support arm (3) and release arm (4).

9. The holding device as claimed in claim 1, characterized in that the releasing plane (10) is parallel with the rotation axis (5) of the holding hook (2).

10. A storage system (100) for container stacks (200) with stocking and retrieving from below, comprising at least one vertical shaft (101) for at least partially receiving a container stack (200), having a lower opening (102) for stocking and retrieving containers (201), wherein at least one holding device (1) for holding a container stack (200) in the shaft (101) is provided in the region of the lower opening (102) of the at least one shaft (101), characterized in that at least one of the holding devices (1) is configured according to claim 1.

11. The storage system as claimed in claim 10, characterized in that at least one holding device (1) according to claim 1 is provided in the region of the lower opening (102) on each of two opposite sides of the shaft (101).

12. The storage system as claimed in claim 11, characterized in that at least two holding devices (1) according to claim 1 are provided in the region of the lower opening (102) on each of two opposite sides of the shaft (101).

13. The storage system as claimed in claim 10, characterized in that the spacing between two opposite holding devices (1) is chosen in such a manner that, when stocking a container (200) from below, the support arms (3) of the holding hooks (2) of the holding devices (1) are pivoted by the container (201) to be stocked only in the region between the respective holding positions and positions of unstable equilibrium thereof.

14. The storage system as claimed in claim 10, characterized in that the storage system (100) comprises a storage operation apparatus (300) for stocking and retrieving containers (201) from below, which storage operation apparatus (300) when retrieving the lowermost container (201) of a container stack (200) laterally projects beyond the container (201) to be retrieved in such a manner that the support arms (3) of the holding hooks (2) of the holding devices (1), when lifting the container stack (200) by way of the storage operation apparatus (300), by way of the lateral projection are pivotable to the respective regions between the position of unstable equilibrium and the retrieving position.

* * * * *